United States Patent
Roman Sanchez et al.

(10) Patent No.: US 11,628,895 B1
(45) Date of Patent: Apr. 18, 2023

(54) SPROCKET FOR MOBILE ROBOT TRACK DRIVE

(71) Applicant: The United States of America as Represented by the Secretary of the Navy, Indian Head, MD (US)

(72) Inventors: Juan Carlos Roman Sanchez, Alexandria, VA (US); Andrew Paul Czop, Alexandria, VA (US); Adam Shaker, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 673 days.

(21) Appl. No.: 16/602,923

(22) Filed: Dec. 30, 2019

(51) Int. Cl.
| | | |
|---|---|---|
| *B62D 55/12* | (2006.01) | |
| *B25J 5/00* | (2006.01) | |
| *B62D 55/075* | (2006.01) | |
| *B62D 55/14* | (2006.01) | |
| *B62D 55/24* | (2006.01) | |
| *B62D 55/26* | (2006.01) | |

(52) U.S. Cl.
CPC .............. *B62D 55/12* (2013.01); *B25J 5/005* (2013.01); *B62D 55/075* (2013.01); *B62D 55/145* (2013.01); *B62D 55/244* (2013.01); *B62D 55/26* (2013.01)

(58) Field of Classification Search
CPC ...... B62D 55/12; B62D 55/244; B62D 55/26; B25J 5/005
USPC ......................................................... 305/195
See application file for complete search history.

(56) References Cited

U.S. PATENT DOCUMENTS

| | | | | |
|---|---|---|---|---|
| 1,241,617 A | * | 10/1917 | Fuller et al. ........... | B62D 55/20 305/44 |
| 1,574,042 A | * | 2/1926 | Bager .................... | B62D 55/08 305/195 |
| 1,986,270 A | * | 1/1935 | Kegresse ............... | F16H 55/54 474/54 |
| 2,303,945 A | * | 12/1942 | Mayne ................. | B62D 55/253 305/167 |
| 3,451,728 A | | 6/1969 | Bruneau | |
| 3,472,563 A | | 10/1969 | Irgens | |
| 3,688,858 A | | 9/1972 | Jespersen | |
| 4,003,608 A | * | 1/1977 | Carter ................... | B62D 55/08 305/196 |
| 5,855,421 A | * | 1/1999 | Kautsch .............. | B62D 55/125 305/136 |
| 6,006,847 A | * | 12/1999 | Knight .................. | B62D 55/04 180/9.26 |
| 6,508,524 B2 | | 1/2003 | Rutz et al. | |
| 8,360,535 B2 | * | 1/2013 | Johannsen ............. | B62D 55/32 305/137 |
| 8,480,109 B1 | * | 7/2013 | Adams .................... | B62M 9/02 280/261 |

(Continued)

FOREIGN PATENT DOCUMENTS

EP 1291270 B1 12/2003

*Primary Examiner* — Kevin Hurley
*Assistant Examiner* — Maurice L Williams
(74) *Attorney, Agent, or Firm* — Fredric J. Zimmerman

(57) ABSTRACT

A novel sprocket for a track drive of a mobile robot may allow for some deformation of the track so that the track better conforms to the surface on which the robot travels. The novel sprocket also may prevent excessive track deformation or deflection that may result in undesirable detracking.

18 Claims, 8 Drawing Sheets

(56) References Cited

U.S. PATENT DOCUMENTS

| | | | |
|---|---|---|---|
| 8,746,815 B2 * | 6/2014 | Reshad | B62D 55/12 |
| | | | 305/195 |
| 8,770,676 B2 * | 7/2014 | Yelistratov | B62D 55/32 |
| | | | 305/137 |
| 9,481,411 B2 * | 11/2016 | Meyer | B62D 55/15 |
| 10,427,735 B2 | 10/2019 | Eavenson, Sr. et al. | |
| 11,059,530 B2 * | 7/2021 | Sho | B62D 55/08 |
| 2002/0113489 A1 * | 8/2002 | Oertley | B62D 55/125 |
| | | | 305/136 |
| 2009/0178863 A1 | 7/2009 | Pink | |
| 2012/0001478 A1 * | 1/2012 | Zuchoski | B62K 5/01 |
| | | | 305/137 |
| 2015/0076898 A1 * | 3/2015 | Eavenson, Sr. | F16H 55/30 |
| | | | 305/199 |
| 2015/0345109 A1 * | 12/2015 | Vik | E02F 9/02 |
| | | | 180/9.62 |
| 2017/0113742 A1 * | 4/2017 | Tratta | B62D 55/04 |
| 2018/0021947 A1 | 1/2018 | Goldenberg et al. | |
| 2018/0346040 A1 * | 12/2018 | Grenzi | B62D 55/14 |
| 2022/0194494 A1 * | 6/2022 | Tripp | B62D 55/12 |
| 2022/0194498 A1 * | 6/2022 | Hart | B33Y 50/02 |
| 2022/0212345 A1 * | 7/2022 | Smith | B25J 13/088 |

\* cited by examiner

SPROCKET FOR MOBILE ROBOT TRACK DRIVE

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to tracked vehicles and in particular to sprockets for track drives of mobile robots.

BACKGROUND OF THE INVENTION

Mobile robots are used by military, law enforcement and security forces. Mobile robots are used in hazardous situations and in remote locations. Mobile robots often include tracks. Tracks are the ground-contacting portion of some conventional drive systems for mobile robots. Tracks typically include a belt having a number of cleats disposed transversely to the belt's longitudinal direction. Due to their high traction compared to wheels, tracks have found application in many fields. Drive systems employing tracks may provide a more versatile set of capabilities than wheeled systems for tasks such as navigation over rough terrains and obstacle climbing.

De-tracking can be a problem with tracked mobile robots. De-tracking occurs when the track becomes disengaged from the sprockets on which the track rests. The tracks of some mobile robots are made of a flexible material, such as natural or synthetic rubbers. Some conventional sprocket designs attempt to prevent de-tracking by preventing or minimizing deflection or deformation of the flexible track itself. In some cases, the necessary contact of the track to the surrounding surface cannot be achieved and the track will not provide the traction needed to move the robot.

A need exists for a track drive design that provides the necessary contact of the track with irregular or non-planar surfaces to move the robot over the irregular or non-planar surface.

SUMMARY OF THE INVENTION

One aspect of the invention is a sprocket for a mobile robot driven by a pair of parallel tracks. The sprocket may include a hub having a central axis and a circumferential rim connected to the hub by a plurality of radial spokes extending from the hub to the rim. Each spoke may have a fin formed on a radially outer portion thereof. The fin may be symmetric about a plane that is normal to the central axis and bisects the rim. The fin may include upper and lower sides parallel to the central axis and a pair of opposing lateral sides that extend from the upper side to the lower side. Each upper side may have a width that is greater than a transverse width of teeth engaging openings in the track but less than a transverse width of the track. The lower side may be wider than the upper side such that each opposing lateral side forms an angle F with a normal to the lower side wherein the normal lies in a plane of the fin and the angle F is in a range of about ten to about fifty degrees.

A plurality of teeth may extend radially outward from the rim and engage the teeth-engaging openings in the tracks wherein each fin is disposed at a circumferential location of a respective one of the plurality of teeth.

Circumferential areas of the rim between each pair of teeth may each include a radially outermost surface and a width of each circumferential area may increase radially inwardly from the radially outermost surface.

The hub may include a metal portion configured to interface with a drive shaft.

A second aspect of the invention is a mobile robot including a pair of parallel tracks having teeth engaging openings formed therein. A pair of the above-described sprockets of the first aspect of the invention may be engaged with and drive respective ones of the pair of tracks.

A further aspect of the invention is a method that includes providing a mobile robot as described in the second aspect of the invention and deflecting laterally outer edges of each track of the pair of parallel tracks.

The method may include preventing de-tracking of the tracks. The step of deflecting the laterally outer edges of each track may include bending the laterally outer edges over the upper sides of the fins on each of the pair of the sprockets. The step of preventing de-tracking of the tracks may include limiting deflection of the laterally outer edges of the track using the opposing lateral sides of the fins.

The invention will be better understood, and further aspects, objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

A novel sprocket for a track drive of a mobile robot enables some deformation/deflection of the lateral outer sides of the track so that the track can conform to the surface on which the robot travels. If the track cannot deform to some extent, the necessary contact of the track to the surrounding surface may not be achieved and the track may not provide the traction needed to move the robot. The novel sprocket may prevent excessive track deformation or deflection that may result in undesirable de-tracking. Terrain that may be encountered by robot 10 includes, but is not limited to, small rubble, large rubble, 18" culverts, 24" culverts, loose sand, mud, dirt, and tall grass, to name a few.

In some exemplary embodiments, the novel sprocket may maintain positive tooth to track engagement thereby allowing the track to conform to a variety of ground terrains. Simultaneously, the sprocket may prevent undesirable de-tracking by resisting the track rolling over the neutral axis of the sprocket through the use of finned geometric features.

Figure 1:
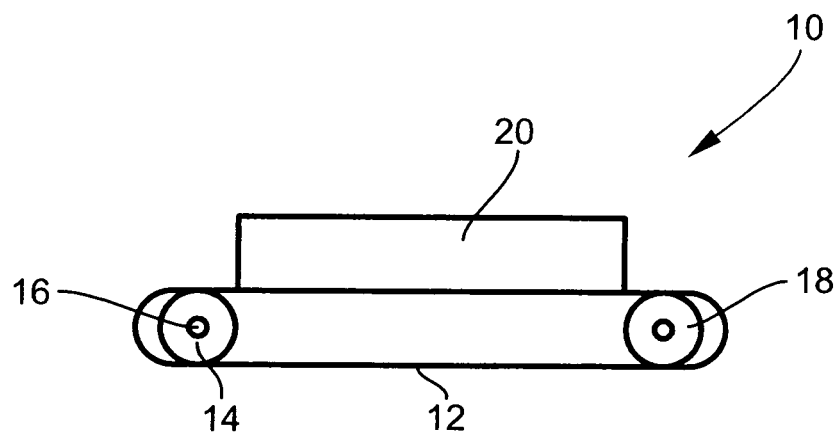
FIG. 1 is a side schematic drawing of a mobile robot with tracks.

FIG. 1 is a side schematic view of a mobile robot 10 driven by a pair of parallel tracks 12. Track 12 may be driven by drive sprocket 14 via drive shaft 16. Track 12 also may engage and travel around second sprocket 18, which need not be a drive sprocket. Drive sprocket 14 may transmit torque to track 12. A second track 12 (not shown) with a drive sprocket 14 and sprocket 18 is disposed on the opposite side of robot 10. Robot 10 may carry a payload 20. Payload 20 may comprise a wide range of features, such as sensors, cameras, mobile arms, etc.

Figure 2:
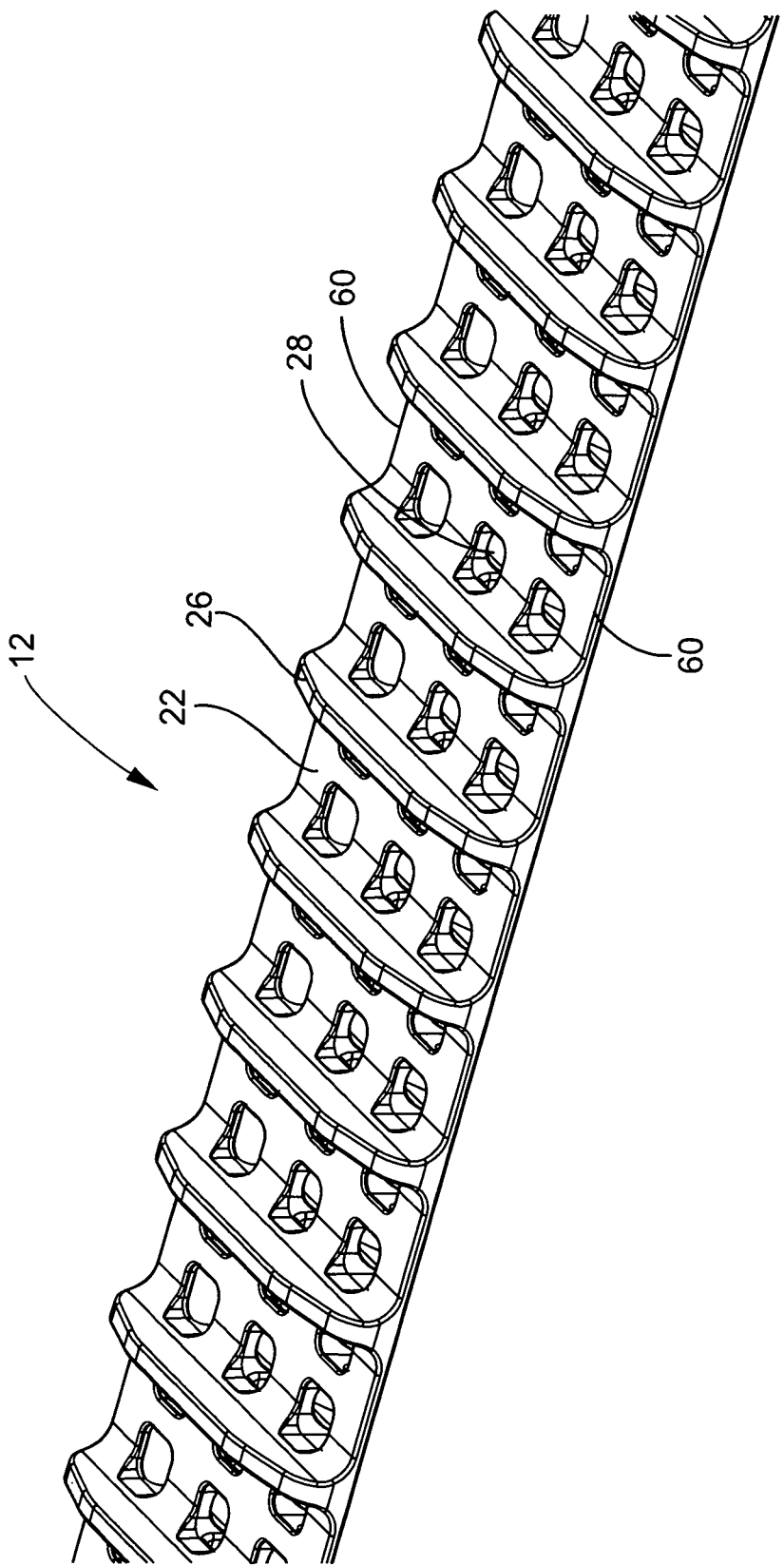
FIG. 2 is a perspective view of a portion of a conventional track.

FIG. 2 is a perspective view of a portion of a conventional track 12. Track 12 may include an outer, ground-engaging surface 22 and an inner surface 24. Outer surface 22 may include cleats 26 formed thereon. Cleats 26 may contact the ground or other surface on which robot 10 is resting. Openings 28 may be formed in track 12. Teeth 30 of drive sprocket 14 (FIG. 3) may engage openings 28 in track 12 to thereby transfer torque from the drive shaft 16 (FIG. 1) to the track 12. Track 12 may be made of, for example, an elastomer or plastic. One example of a suitable elastomer is vulcanized synthetic or natural rubber.

Figure 3:
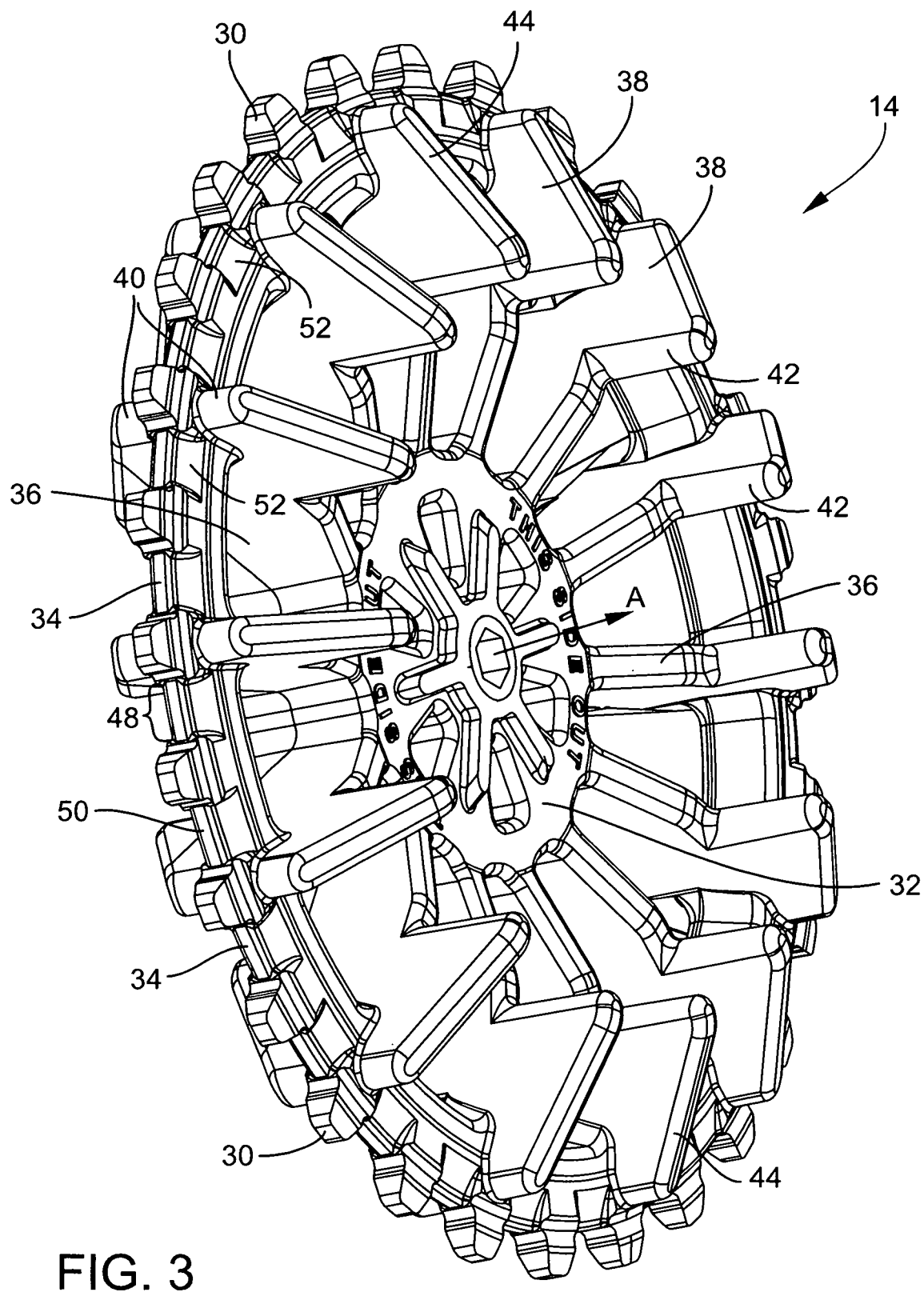
FIG. 3 is a perspective view of one exemplary embodiment of a novel sprocket for engaging the track of a mobile robot.

FIG. 3 is a perspective view of one embodiment of a novel sprocket 14 for engaging the track 12 of the mobile robot 10. Sprocket 14 may include a hub 32 having a central longitudinal axis A. In some exemplary embodiments, sprocket 14 transfers torque from drive shaft 16 (FIG. 1) to track 12. In other exemplary embodiments, sprocket 14 may be an idler sprocket that does not transfer torque from a drive shaft to track 12. Sprocket 14 may be made of, for example, an elastomer. The elastomer may be, for example, a thermoplastic vulcanizate. One example of a preferred thermoplastic vulcanizate is ExxonMobil's Santoprene®.

Sprocket 14 may include a circumferential rim 34 connected to the hub 32 by a plurality of radial spokes 36 extending from the hub 32 to the rim 34. A plurality of teeth 30 may extend radially outward from the rim 34. Teeth 30 engage the openings 28 in the tracks 12. In the embodiment shown, the teeth 30 engage only the middle row of the three rows of openings 28 (FIG. 2). The openings 28 not engaged by teeth 30 may be useful for reducing the weight of track 12.

Figure 4:
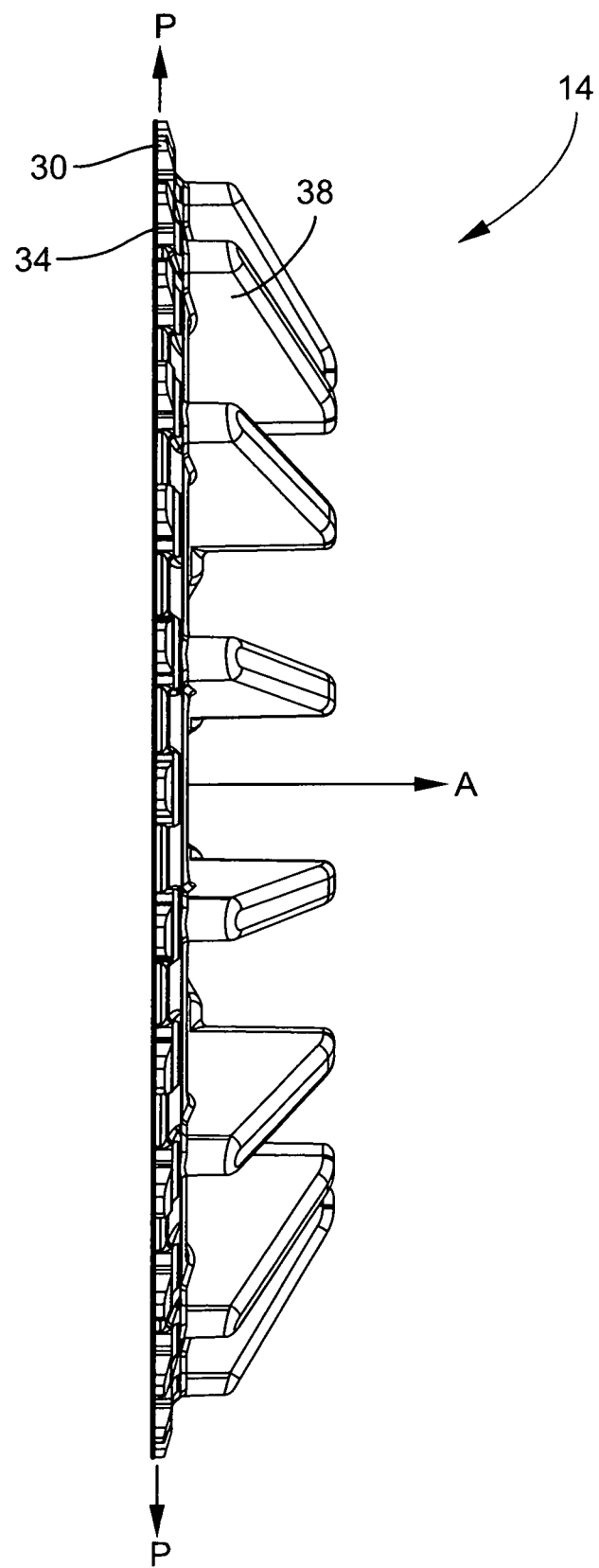
FIG. 4 is a partial side view of the sprocket of FIG. 3 bisected by a plane P with half of the sprocket removed.

Each spoke 36 may include a fin 38 formed on a radially outer portion thereof. Each fin 38 may be formed on the sprocket 14 at a circumferential location of one of the plurality of teeth 30. FIG. 4 is a partial side view of the sprocket 14 of FIG. 3 bisected by a plane P with half of the sprocket 14 removed. Referring to FIG. 4, each fin 38 may be symmetric about plane P. Plane P is normal to the central axis A and bisects the rim 34.

Figure 5:
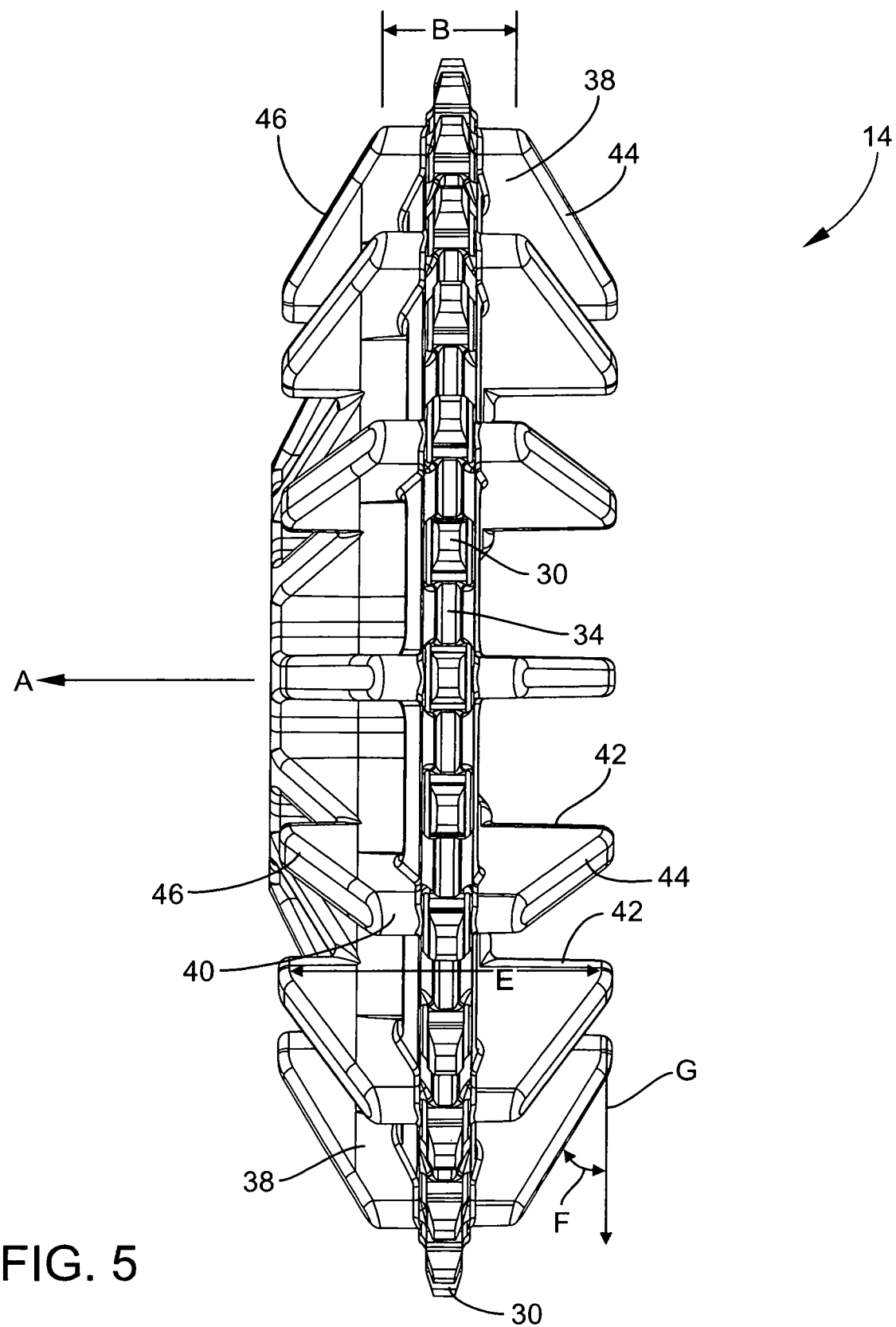
FIG. 5 is a side view of the sprocket of FIG. 3.
Figure 6:
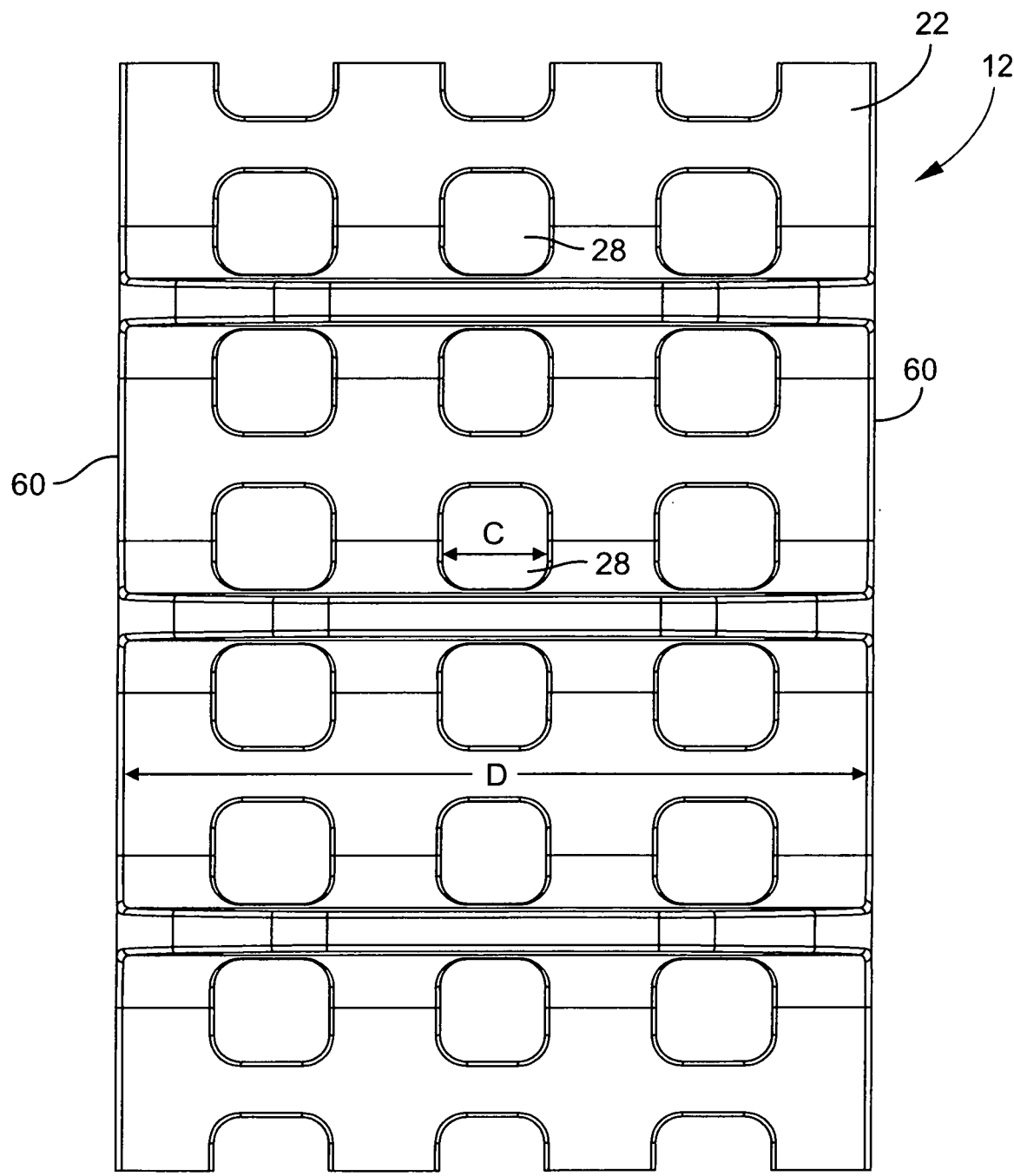
FIG. 6 is an enlarged top view of a portion of the track of FIG. 2.

As shown in the enlarged view of FIG. 5, each fin 38 may include an upper side 40 and a lower side 42. Upper and lower sides 40, 42 may be parallel to the central longitudinal axis A. A pair of opposing lateral sides 44, 46 may extend from upper side 40 to lower side 42. Each upper side 40 may have a width B that is greater than a transverse width C (see FIG. 6) of teeth engaging openings 28 in the track 12. Width B of each upper side 40 may also be less than the transverse width D (FIG. 6) of the track 12. Particularly, width B of upper side 40 may be less than half the transverse width D of the track 12. More particularly, width B of the upper side 40 may be in a range of about 15% to about 30% of the transverse width D of the track 12. As the width B of upper side 40 decreases, the amount of deformation of track 12 that is possible may increase.

Figure 9A:
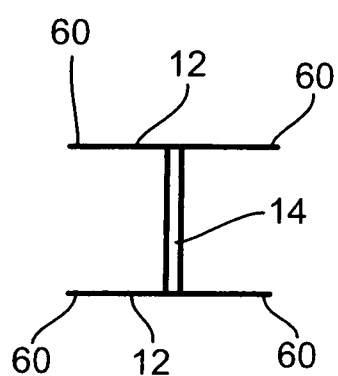
FIG. 9A is a schematic sectional drawing showing laterally outer edges of the track in an undeformed state.
Figure 9B:
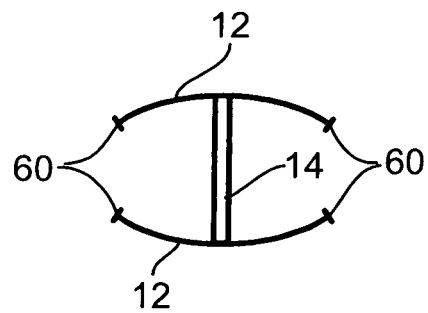
FIG. 9B is a schematic sectional drawing showing laterally outer edges of the track in a deformed state.

Deformation of track 12 refers to the bending of the lateral outside edges 60 of the track 12 inwardly towards sprocket 14. FIG. 9A is a schematic sectional view of track 12 and sprocket 14 showing laterally outer edges 60 of the track 12 in an non-deformed state. FIG. 9B is a schematic drawing showing laterally outer edges 60 of the track 12 in a deformed state. FIGS. 9A and 9B are not to scale and are intended to show the type of deflection/deformation of track 12 and do not necessarily represent the quantity of deformation/deflection of track 12. The type of track deformation represented in FIG. 9B may be helpful in the case of a mobile tracked robot traversing a curved surface, especially a rigid curved surface, for example, the interior of a culvert.

Width E of lower side 42 may be wider than width B of upper side 40. Therefore, each opposing lateral side 44, 46 may form an angle F (see FIG. 5) with a line G that is normal to the lower side 42 and in the plane of fin 38. Angle F may be, for example, in a range of about ten to about fifty degrees. More particularly, angle F may be in a range of about twenty degrees to about forty degrees. As angle F increases, the amount of deformation of track 12 that is possible may decrease. Thus, lateral sides 44, 46 may function as a check on the maximum amount of deformation/deflection of track 12 shown in FIG. 9B and thereby prevent de-tracking of track 12 due to excessive track deformation/deflection.

Figure 7:
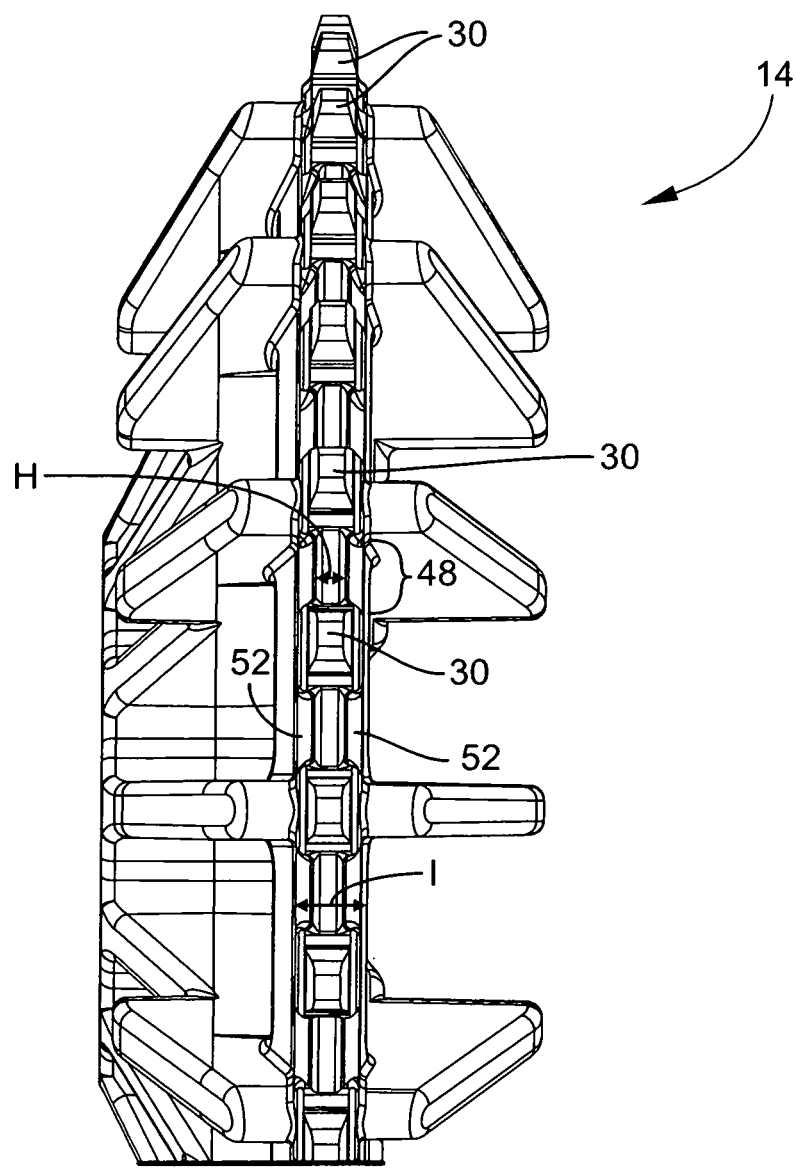
FIG. 7 is an enlarged view of a portion of FIG. 5.

FIG. 7 is an enlarged view of a portion of the sprocket 14 of FIG. 5. Each pair of teeth 30 may define a circumferential area 48 of the rim 34 there between. The radially outermost surface 50 of area 48 has a width H. Moving radially inward from the outermost surface 50, the width of area 48 increases linearly to width I thereby forming tapered side surfaces 52 (see also FIG. 3). Tapered side surfaces 52 may help prevent build-up of matter along the rim 34. Excess matter along the rim 34 may interfere with the engagement of teeth 30 into openings 28 by clogging openings 28.

Figure 8:
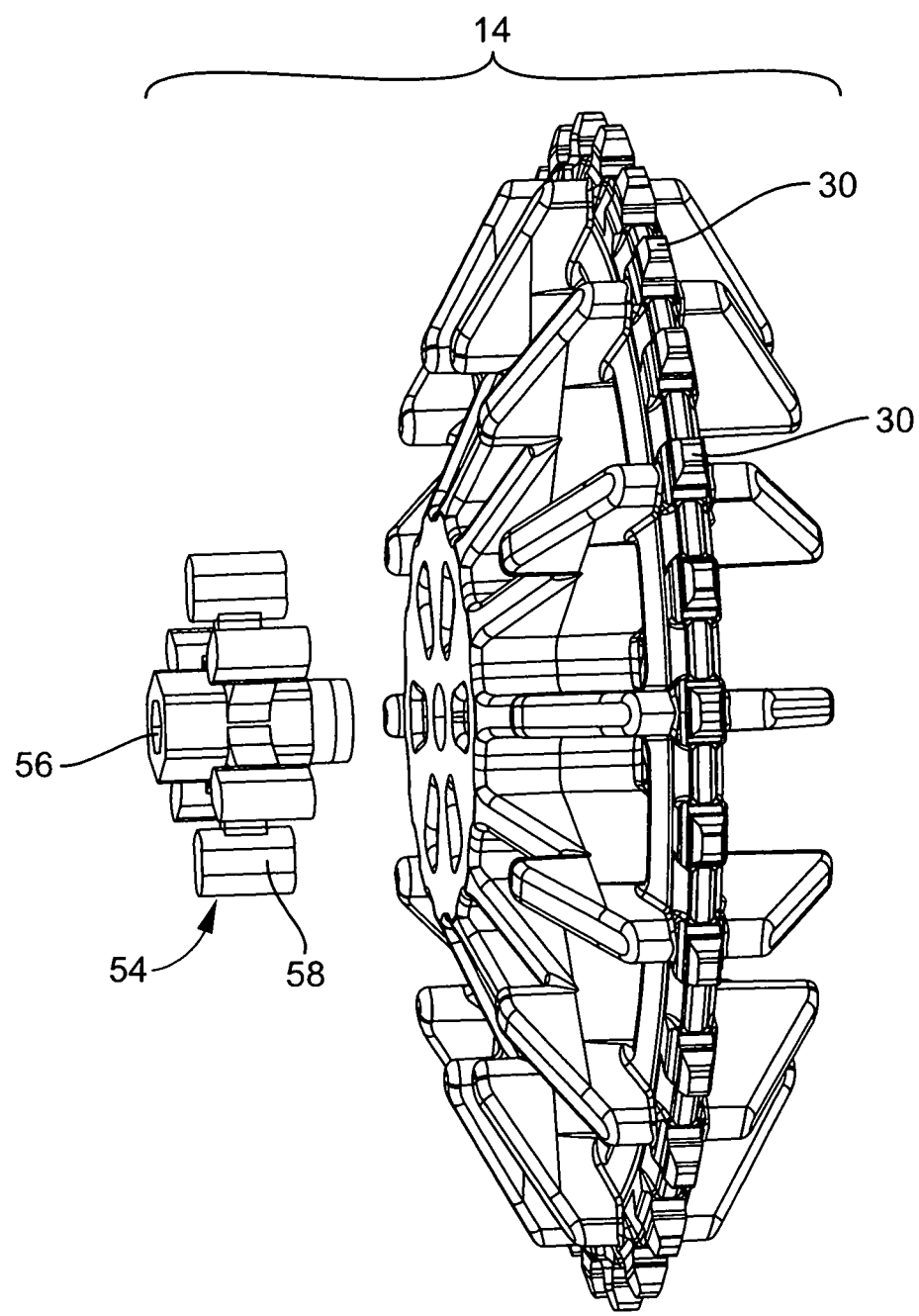
FIG. 8 is an exploded view of one exemplary embodiment of a novel sprocket for engaging and driving a track of a mobile robot.

FIG. 8 is an exploded view of sprocket 14 showing a metal core or portion 54 with an opening 56 therein for receiving, for example, a drive shaft 16 (FIG. 1). Opening 56 may be, for example, a hexagonal opening for interfacing with a hexagonal drive shaft. Core 54 may include a plurality of radial spokes 58. In one exemplary embodiment, sprocket 14 may be an over mold product manufactured by injection molding. The metal core 54 may be placed within a mold before being over molded by the resin material that will eventually make the rest of the sprocket 14. As noted above, the sprocket material may be a thermoplastic vulcanizate such as ExxonMobil's Santoprene®. This material may mimic vulcanized rubber at less cost and with less manufacturing complexity. The metal core 54 may help ensure torque transition between the robot drive shaft 16 and the track 12 without any tearing or shearing of the sprocket hub 32 or spokes 36.

Any numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A sprocket for a mobile robot driven by a pair of parallel tracks, comprising:
   a hub having a central axis;
   a circumferential rim being connected to the hub by a plurality of radial spokes extending from the hub to the rim;
   each of the plurality of radial spokes having a fin being formed on a radially outer portion thereof, the fin is symmetric about a plane that is normal to the central axis and bisects the rim, the fin comprises upper and lower sides parallel to the central axis and a pair of opposing lateral sides that extend from the upper side to the lower side, each of the upper sides includes a width that is greater than a transverse width of teeth engaging openings in the track but less than a transverse width of the track; the lower side is wider than the upper side such that each opposing lateral side forms an angle F with a normal to the lower side, wherein the normal lies in a plane of the fin and the angle F is in a range of ten to fifty degrees; and
   a plurality of teeth extending radially outward from the rim and being configured for engaging the teeth-engaging openings in the tracks,
   wherein each of the fins is disposed at a circumferential location of a respective one of the plurality of teeth wherein the circumferential rim includes a plurality of circumferential areas, wherein each of the plurality of the circumferential areas is situated between a pair of the plurality of teeth and includes a radially outermost surface, and wherein a width of each of the plurality of circumferential area increases radially inwardly from the radially outermost surface.

2. The sprocket of claim 1, wherein the sprocket is made of an elastomer.

3. The sprocket of claim 2, wherein the hub includes a metal portion configured to interface with a drive shaft.

4. The sprocket of claim 2, wherein the hub includes a metal portion configured to interface with a drive shaft, and wherein the metal portion defines a hexagonal opening for the drive shaft.

5. The sprocket of claim 1, wherein the opposing lateral sides have equal lengths.

6. The sprocket of claim 1, wherein the width of the upper side is less than half the transverse width of the track.

7. The sprocket of claim 6, wherein a width of the upper side is in a range of 15% to 30% of the transverse width of the track.

8. The sprocket of claim 1, wherein the angle F is in a range of twenty degrees to forty degrees.

9. The sprocket of claim 1 wherein the width increases linearly.

10. A mobile robot, comprising:
    a pair of parallel tracks having teeth engaging openings formed therein; and
    a pair of the sprockets of claim 1 that are engaged with and drive respective ones of the pair of tracks.

11. A method, comprising:
    providing the mobile robot of claim 10; and
    deflecting laterally outer edges of each track of the pair of parallel tracks.

12. The method of claim 11, further comprising preventing de-tracking of the tracks.

13. The method of claim 12, wherein said preventing de-tracking of the tracks includes limiting deflection of the laterally outer edges of the track using the opposing lateral sides of the fins.

14. The method of claim 11, wherein said deflecting the laterally outer edges of each track includes bending the laterally outer edges over the upper sides of the fins on each of the pair of the sprockets.

15. A drive sprocket for a mobile robot driven by a track, comprising:
    a hub having a central axis;
    a circumferential rim being connected to the hub by a plurality of radial spokes extending from the hub to the rim;
    each of the plurality of radial spokes includes a fin formed on a radially outer portion thereof, the fin comprises upper and lower sides parallel to the central axis and a pair of opposing lateral sides that extend from the upper side to the lower side, each of the upper sides includes a width that is greater than a transverse width of teeth engaging openings in the track but less than a transverse width of the track; the lower side is wider than the upper side such that each opposing lateral side forms an angle F with a normal to the lower side, wherein the normal lies in a plane of the fin and the angle F is in a range of ten to fifty degrees; and
    a plurality of teeth extending radially outward from the rim and being configured for engaging teeth-engaging openings in the tracks, wherein each of said fin is disposed at a circumferential location of a respective one of the plurality of teeth,
    wherein the circumferential rim includes a plurality of circumferential areas, wherein each of the plurality of the circumferential areas is situated between a pair of the plurality of teeth and includes a radially outermost surface, and wherein a width of each of the plurality of circumferential area increases radially inwardly from the radially outermost surface.

16. The drive sprocket of claim 15, wherein the hub includes a metal portion with an opening for receiving a drive shaft.

17. The sprocket of claim 15, wherein the width of the upper side is less than half the transverse width of the track.

18. A drive sprocket for a mobile robot driven by a pair of parallel tracks, comprising:
    a hub having a central axis;
    a circumferential rim being connected to the hub by a plurality of radial spokes extending from the hub to the rim;
    each of the plurality of spokes includes a fin formed on a radially outer portion thereof, the fin is symmetric about a plane that is normal to the central axis and bisects the rim, the fin comprises upper and lower sides parallel to the central axis and a pair of opposing lateral sides of equal length that extend from the upper side to the lower side, each of the upper sides includes a width that is less than half the transverse width of the track; wherein the lower side is wider than the upper side such that each opposing lateral side forms an angle F with a normal to the lower side, and wherein the normal lies in a plane of the fin and the angle F is in a range of twenty to forty degrees; and
    a plurality of teeth extending radially outward from the rim and being configured for engaging teeth-engaging openings in the tracks, wherein each fin is disposed at a circumferential location of a respective one of the plurality of teeth,
    wherein the circumferential rim includes a plurality of circumferential areas, wherein each of the plurality of the circumferential areas is situated between a pair of the plurality of teeth and includes a radially outermost surface, and wherein a width of each of the plurality of circumferential area increases radially inwardly from the radially outermost surface.

\* \* \* \* \*